(12) United States Patent
Forrester

(10) Patent No.: US 7,530,939 B2
(45) Date of Patent: May 12, 2009

(54) METHOD FOR STABILIZATION OF HEAVY METALS IN INCINERATOR BOTTOM ASH AND ODOR CONTROL WITH DICALCIUM PHOSPHATE DIHYDRATE POWDER

(75) Inventor: Keith Edward Forrester, Meredith, NH (US)

(73) Assignee: Keith E. Forrester, Meredith, NH (US)

( * ) Notice: Subject to any disclaimer, the term of this patent is extended or adjusted under 35 U.S.C. 154(b) by 119 days.

(21) Appl. No.: 11/713,857

(22) Filed: Mar. 5, 2007

(65) Prior Publication Data

US 2007/0225541 A1 Sep. 27, 2007

Related U.S. Application Data

(60) Provisional application No. 60/786,035, filed on Mar. 25, 2006.

(51) Int. Cl.
*B09B 3/00* (2006.01)
(52) U.S. Cl. .......................... 588/256; 588/412
(58) Field of Classification Search .............. 588/315, 588/412, 256
See application file for complete search history.

(56) References Cited

U.S. PATENT DOCUMENTS

| | | | |
|---|---|---|---|
| 4,113,504 A | 9/1978 | Chen et al. | |
| 4,629,509 A | 12/1986 | O'Hara et al. | |
| 4,652,381 A | 3/1987 | Inglis | |
| 4,737,356 A | 4/1988 | O'Hara et al. | |
| 4,889,640 A | 12/1989 | Stanforth | |
| 4,955,519 A | 9/1990 | Forrester | |
| 5,037,479 A | 8/1991 | Stanforth et al. | |
| 5,040,920 A | 8/1991 | Forrester | |
| 5,202,033 A | 4/1993 | Stanforth et al. | |
| 5,245,114 A | 9/1993 | Forrester | |
| 5,430,233 A | 7/1995 | Forrester | |
| 5,536,899 A | 7/1996 | Forrester | |
| 5,722,928 A | 3/1998 | Forrester | |
| 5,846,178 A | 12/1998 | Forrester | |
| 5,860,908 A | 1/1999 | Forrester | |
| 6,050,929 A | 4/2000 | Forrester | |
| 6,186,939 B1 | 2/2001 | Forrester | |
| 6,515,053 B1 | 2/2003 | Forrester | |
| 6,688,811 B2 | 2/2004 | Forrester | |
| 7,121,995 B2 | 10/2006 | Forrester | |
| 2003/0143031 A1 | 7/2003 | Forrester | |
| 2004/0006253 A1 | 1/2004 | Forrester | |
| 2004/0015036 A1 | 1/2004 | Forrester | |
| 2004/0018130 A1 | 1/2004 | Forrester | |
| 2004/0024281 A1 | 2/2004 | Forrester | |
| 2004/0024283 A1 | 2/2004 | Forrester | |
| 2004/0034267 A1 | 2/2004 | Forrester | |
| 2004/0068156 A1 | 4/2004 | Forrester | |
| 2004/0091549 A1 | 5/2004 | Forrester | |
| 2004/0116766 A1 | 6/2004 | Forrester | |
| 2005/0049449 A1* | 3/2005 | Forrester | .............. 588/256 |
| 2005/0209496 A1 | 9/2005 | Forrester | |
| 2005/0209497 A1 | 9/2005 | Forrester | |
| 2005/0215841 A1 | 9/2005 | Forrester | |
| 2006/0036124 A1 | 2/2006 | Forrester | |
| 2006/0178548 A1 | 8/2006 | Forrester | |
| 2006/0189837 A1 | 8/2006 | Forrester | |
| 2007/0225541 A1 | 9/2007 | Forrester | |

FOREIGN PATENT DOCUMENTS

| | | |
|---|---|---|
| GB | 2 277 515 A | 11/1994 |
| WO | WO 98/24938 A1 | 6/1998 |
| WO | WO 98/57710 A1 | 12/1998 |

OTHER PUBLICATIONS

"TCLP Procedure," Federal Register, 55(126): 26985-26998 (Jun. 1990).

Shih et al., "Application of Dry Chemical Stabilization Technology in Taiwan Kobin Bottom Ash Processing & Recycle Plant," North American Waste-To-Energy Conference (May 1-3, 2006).

* cited by examiner

Primary Examiner—John Kreck
(74) *Attorney, Agent, or Firm*—Hamilton, Brook, Smith & Reynolds, P.C.

(57) ABSTRACT

This invention provides a method for stabilization and treatment of heavy metal bearing materials and wastes subject to acid leaching tests or leach conditions and odor limits by addition of acid semi-soluble DiCalcium Phosphate DiHydrate such that the leaching potential is inhibited to desired levels and odors are reduced to desired levels and the material or waste is free flowing, more permeable, less weight and permits immediate handling and disposal or reuse. The resultant material or waste after stabilization is deemed suitable for on-site reuse, off-site reuse or disposal as RCRA non-hazardous waste.

8 Claims, No Drawings

METHOD FOR STABILIZATION OF HEAVY METALS IN INCINERATOR BOTTOM ASH AND ODOR CONTROL WITH DICALCIUM PHOSPHATE DIHYDRATE POWDER

RELATED APPLICATION

This application claims the benefit of U.S. Provisional Application No. 60/786,035, filed on Mar. 25, 2006. This patent application incorporates and embodies the above application.

BACKGROUND OF THE INVENTION

Over the past thirty years, the potential and observed dangers of heavy metal bearing materials and waste exposure to humans and the environment and the generation of nuisance odors and from solid waste management facilities has been the basis of extensive regulatory control. The leaching and transport of heavy metals into surface water bodies and groundwater is a grave concern because of the danger that the drinking water supplies and the environment will become contaminated. Heavy metal bearing materials and wastes, such products or waste, paint residues, sludge, plating wastes, sediments, foundry dusts, casting sands, steel mill dusts, shredder residues, wire insulation, refuse incinerator flyash, incinerator bottom ash, incinerator combined ash, scrubber residues from air pollution control devices such as cyclones, electrostatic precipitators and bag-house filter bags, may be deemed hazardous by the United States Environmental Protection Agency (U.S. EPA) pursuant to 40 C.F.R. Part 261 if containing certain soluble heavy metals above regulatory limits. Any solid waste can be defined as hazardous either because it is "listed" in 40 C.F.R., Part 261 Subpart D or because it exhibits one or more of the characteristics of a hazardous waste as defined at Part 261, Subpart C. These characteristics are: (1) ignitability, (2) corrosivity, (3) reactivity, and (4) toxicity as tested under the Toxicity Characteristic Leaching Procedure (TCLP). Heavy metal bearing materials and wastes can also be regulated under state and federal groundwater and surface water protection standards, which set total and leachable limits for heavy metals often lower than the TCLP criteria, as the wastes and materials are not in a lined landfill and exposed to direct groundwater, drinking water, storm waters and surface water bodies. The odor produced during management or stabilization of these wastes and materials, such as from refuse incinerator ash residues and operations that process ash residues, can become problematic for the operators of such facilities, as many waste generation and stabilization operations are nearby industrial, commercial and/or residential settings. Odor emissions are regulated mostly under local ordinance rules of nuisance and some countries under federal and/or state air quality regulations.

40 C.F.R., Part 261.24(a), contains a list of contaminants and their associated maximum allowable concentrations. The inorganic list includes As, Ag, Ba, Cd, Cr, Pb, Hg, and Se. If a contaminant exceeds its maximum allowable concentration, when tested using TCLP analysis as specified at 40 C.F.R. Part 261 Appendix 2, then the material is classified as hazardous. The TCLP test uses a dilute acetic acid either in de-ionized water (TCLP fluid 2) or in de-ionized water with a sodium hydroxide buffer (TCLP fluid 1). Both extracts attempt to simulate the leachate character from a decomposing trash landfill in which the hazardous waste being tested for is assumed to be disposed of in, and thus subject to the acetic acid leaching condition. Waste containing leachable heavy metals is currently classified as hazardous waste due to the toxicity characteristic, if the level of TCLP analysis is above 0.2 to 100 milligrams per liter (mg/L) or parts per millions (ppm) for defined metals. The TCLP test is designed to simulate a worst-case leaching situation, i.e., leachate which would typically be found in the interior of an actively degrading municipal landfill. Such landfills normally are slightly acidic with a pH of approximately 5+0.5. Countries outside of the US also use the TCLP test as a measure of leachability such as Taiwan, Philippines, Thailand, and Canada. Thailand also limits solubility of Cu and Zn, as these are metals of concern to Thailand groundwater. Switzerland and most European countries also regulate management of solid wastes by measuring heavy metals and salts as tested by a sequential leaching method using carbonated water simulating acid rainwater. Japan and the United Kingdom use similar carbonated DI water leach tests to measure for landfill leaching potential from heavy metals.

Additionally, U.S. EPA land disposal restrictions prohibit the land disposal of treated hazardous wastes that leach in excess of maximum allowable concentrations upon performance of the TCLP analysis. The land disposal regulations require that hazardous wastes are treated until the heavy metals do not leach at Universal Treatment Standard (UTS) levels from the solid waste at levels above the maximum allowable concentrations prior to placement in a surface impoundment, waste pile, landfill or other land disposal unit as defined in 40 C.F.R. 260.10.

Communities have local ordinances that regulate the generation of odors that would be a public nuisance, and in some cases regulators have established maximum allowable odor index levels. Maximum hourly average and daily average chemical gas and particulate levels have also been established under the US Clean Air Act and Amendments, and by OSHA and NIOSH. Odor Index Tests using varied levels of activated carbon mixed with the subject waste or material and utilizing a panel of people with human olfactory sense is one method of comparing odors. The panel is asked to confirm or deny sense of odor, which is related to the amount of activated carbon used in the subject waste and generates an odor index. The lower the index, the stronger the odor would be encountered. There may exist certain health and environmental release risks from the emission and transfer or diffusion of odor bearing gases, and thus the need to control and reduce such odiferous gases may extend beyond a simple nuisance issue. H2S gas for example, having a rotten egg odor, is highly toxic and can cause death in humans upon exposure to lower lethal levels at very low duration.

Leach tests subject solid wastes, including sludge, ash, residues, material or soil, to dilute acetic acid leaching (TCLP), buffered citric acid leaching (STLC), distilled water, synthetic rainwater (SPLP, MEP) or carbonated water leaching (Japanese, UK, Swiss, and USEPA SW-924). Synthetic rainwater leach tests are also often used to measure heavy metal solubility and compare such to groundwater and surface water state and federal standards where materials and wastes are either reused on-site or disposed in a manner other than lined landfills.

Suitable acetic acid leach tests include the USEPA SW-846 Manual described Toxicity Characteristic Leaching Procedure (TCLP) and Extraction Procedure Toxicity Test (EP Tox) now used in Canada. Briefly, in a TCLP test, 100 grams of waste are tumbled with 2000 ml of dilute and buffered acetic acid for 18 hours. The extract solution is made up from 5.7 ml of glacial acetic acid and 64.3 ml of 1.0 normal sodium hydroxide up to 1000 ml dilution with reagent water.

Suitable synthetic acid leach tests include the USEPA SW-846 Manual described Synthetic Precipitant Leaching Procedure (SPLP) and Multiple Extraction Procedure Test (MEP) now used in the US for sites where wastes are reused outside of leachate collected and lined landfills. Briefly, in a SPLP test, 100 grams of waste are tumbled with 2000 ml of dilute nitric and sulfuric acid for 18 hours. The extract solution is made up to pH at near 4.8 simulating acid rainwater East and West of the Mississippi. The MEP is the Multiple Extraction Procedure which uses the TCLP type test for the first extract and followed by 9 cycles of the SPLP, all of which report leachate values, and thus attempt to measure diffusion potential of the waste matrix.

Suitable carbonated water leach tests include the Japanese leach test which tumbles 50 grams of composited waste sample in 500 ml of water for 6 hours held at pH 5.8 to 6.3, followed by centrifuge and 0.45 micron filtration prior to analyses. Another suitable distilled water CO2 saturated method is the Swiss protocol using 100 grams of cemented waste at 1 cm3 in two (2) sequential water baths of 2000 ml. The concentration of heavy metals and salts are measured for each bath and averaged together before comparison to the Swiss criteria.

Suitable citric acid leach tests include the California Waste Extraction Test (WET), which is described in Title 22, Section 66700, "Environmental Health" of the California Health & Safety Code. Briefly, in a WET test, 50 grams of waste are tumbled in a 1000 ml tumbler with 500 grams of sodium citrate solution for a period of 48 hours. The heavy metal concentration is then analyzed by Inductively-Coupled Plasma (ICP) after filtration of a 100 ml aliquot from the tumbler through a 45 micron glass bead filter.

Suitable odor measure test would be include activated carbon modified samples with comparative olfactory measure of resultant odor by human panel.

Of specific interest and concern regarding the present invention is the leaching of individual heavy metal groups including As, Hg, Cd, Cr, Cu, and Pb and combinations thereof under TCLP, SPLP, MEP, CALWET, acid rainwater and acid rain derived surface water conditions and under regulatory tests which attempt to simulate dilute acid water leaching for determination of hazardousness of incinerator ash residues. In addition, the reduction of odor generation from the handling and stabilization of ash is desired, as the processing and stabilization of incinerator ash is often in close proximity to adjacent industrial, commercial and residential settings. In a specific case, incinerator ash management and stabilization caused strong odors which in turn resulted in complaints to regulators, and thus the subject invention was developed to reduce odors and allow for stabilization.

The present invention provides a method of reducing the leachability of material or waste including the groups As, Hg, Cd, Cr, Cu, and Pb and combinations thereof under TCLP, SPLP, MEP, CALWET, acid rainwater and acid rain derived surface water leaching conditions, and reduce sensible odors generated during such stabilization, with use of dilute acid semi-soluble DiCalcium Phosphate DiHydrate (DCPDH) [$CaHPO_4.2H_2O$] pulverized "seed" that minimize weight increase of the treated material or waste and permit immediate stabilized matrix management and handling without water application and mixing, without curing requirements and associated double handling required from interim storage piles, and while producing a free-flowing and more permeable stabilized material or waste suitable for excavator or loader loading, truck unloading and land disposal or immediate reuse spreading and compaction. The present invention recognizes the use of dilute acids as leaching fluids to which DCPDH will be added, and thus teaches use of a stabilizer that is dilute acid semi-soluble.

Unlike the present invention, prior art has taught stabilization of heavy metals by addition of water soluble or water based physical encapsulation agents, and have failed to recognize the value of stabilizers which are not water soluble or have limited water solubility, yet are semi-soluble or available in dilute acetic acid (TCLP), dilute sulfuric and nitric acid (SPLP/MEP) and dilute citric acid (CALWET), and failed to produce a stabilization process with reduction of odor production. In particular, O'Hara (U.S. Pat. No. 4,737,356) and Forrester (U.S. Pat. Nos. 5,245,114 and 5,430,233) teach the need to add water soluble phosphates to incinerator ash, auto shredder and wire insulation wastes, and incinerator bottom ash, which are at least 5 gm/100 ml water solubility, with the preferred embodiment being 100% water soluble phosphoric acid, and which increases the odors from incinerator ash. Prior art stabilization methods using Portland cement, lime, cement kiln dust, phosphoric acids, and combinations also produce a reduced permeability matrix or solid material form by adding water (by combination or as part of the water soluble agent addition) to the stabilization recipe for a chemical reaction which presents post-stabilization handling and disposal complications, whereas the present invention use of pulverized DCPDH acts to reduce metals solubility without significant reduction of waste permeability, without formation of cement-like non-free flowing material or waste, without curing time, without water hydration and associated material and waste weight increase, without double material and soil handling required for curing stockpiles, thus permitting immediate stabilizer material or waste handling, loading, disposal or reuse. The pulverized DCPDH semi-soluble seed stabilization method operates on the basic principle that sufficient wet dilute acid environment contact and mixing between the material or waste and DCPCH will occur within the TCLP, SPLP, MEP or CALWET extraction vessel. Although the exact reason for odor reduction is not know at this time, it is postulated that the odors are reduced due to the fine powder and neutral nature of DCPDH which acts as an adsorbent of organics and sulfides produced from ash. The extraction method(s) used to predict leaching potential all assume that field material or waste disposal conditions are subject to hydration by acid rainwater or acid leachate and involve some degree of interstitial mixing of heavy metals with the extract fluid over some minimal period of time in a saturated environment, and that such hydration can be simulated by an extract solute addition and mixing period. The DCPDH seed stabilization method thus utilizes the regulatory extraction procedure to allow for post-stabilized material or waste hydration, mixing and wet chemistry dilute acid environment contact between heavy metals and DCPDH. The extraction tests thus act as dilute acid stirred tank reactors, which provide the opportunity for heavy metals on the surface of materials and waste, and that which diffuses into the acid solution, to have ample opportunity to contact DCPDH seeds that also have surface active and/or soluble mineral formation potentials with the dilute acid soluble and/or available heavy metals. Studies by the inventor found that the lower surface area non-pulverized forms of DCPDH were less effective in reducing heavy metals solubility, which confirmed that the surface area and semi-solubility of the exposed surface area of DCPDH played an important role in the mineral formation potentials. One unique benefit of the dry seed technology is that SPLP, MEP, TCLP and CALWET extract fluid acid soluble and pulverized DCPDH can be applied to waste or material and dry mixed for uniformity in the field, and consequently test samples of such stabilizers are allowed to freely tumble or mix in the presence of the heavy metals in the extract solution for a given extraction period of time. This non-cemented and non-reacted acid semi-soluble DCPDH pulverized surface mixing greatly improves the wet environment substitution of heavy metals such as Pb, Cd, Cr, Ni, and As into calcium phosphate apatite surfaces. The extraction device effectively puts the heavy metals into solution as well as some DCPDH into solution and remaining DCPDH surfaces into wet contact and thus provides an excellent opportunity for surface substitution, sorption and precipitation of now solution soluble and solution face reactive heavy metals. Under this chemical mechanism, some or all stabilization agents are made available to the solution by the acid solution, and heavy metal ions are made available to the solution which in turn substitute and exchange for calcium on insoluble apatite surfaces and precipitate with stabilization agents in acid solution.

U.S. Pat. No. 5,202,033 describes an in-situ method for decreasing Pb TCLP leaching from solid waste using a combination of solid waste additives and additional pH controlling agents from the source of phosphate, carbonate, and sulfates.

U.S. Pat. No. 5,037,479 discloses a method for treating highly hazardous waste containing unacceptable levels of TCLP Pb such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron.

U.S. Pat. No. 4,889,640 discloses a method and mixture from treating TCLP hazardous lead by mixing the solid waste with an agent selected from the group consisting of reactive calcium carbonate, reactive magnesium carbonate and reactive calcium magnesium carbonate.

U.S. Pat. No. 4,652,381 discloses a process for treating industrial wastewater contaminated with battery plant waste, such as sulfuric acid and heavy metals by treating the waste waster with calcium carbonate, calcium sulfate, calcium hydroxide to complete a separation of the heavy metals. However, this is not for use in a solid waste situation.

Unlike the present invention, however, none of the prior art solutions taught specific dilute acid semi-soluble dry pulverized DCPDH seed stabilization of heavy metal bearing material or waste containing one or more heavy metals while also forming a free-flowing, more permeable stabilized matrix suitable for loading, transport, disposal and reuse without having a cement-like reduced permeability and strength, and without the burden of curing and associated double waste handling, and without reduction of odor. Specifically, prior art has failed to teach the mechanism of acid semi-soluble and pulverized DCPDH seed to allow intentional leaching of heavy metals into the regulatory extraction vessel and subsequent substitution of such metals onto DCPDH surfaces and precipitation and complex formation with a certain acid semi-soluble amount of DCPDH in acid solution.

SUMMARY OF THE INVENTION

The present invention discloses a heavy metal bearing material or waste stabilization method through contact of material or waste with acid semi-soluble DCPDH pulverized seed which complements the material or waste leaching potential and desired free-flowing and more permeable material or waste handling characteristics without hydration, curing and associated additional waste or material interim storage, handling, transport, disposal costs, and provides waste odor reduction. Of specific interest is the disclosure that pulverized DCPDH provides for heavy metal stabilization by surface substitution or by precipitation with acid semi-soluble DCPDH during the regulatory extraction procedure. The DCPDH is provided in dry pulverized chemical form, and thus can be contacted with heavy metal bearing material either prior to waste production such as in-stream at wastewater facilities producing sludge or in-duct prior to air pollution control and ash collection devices or after waste production in material collection devices or waste piles.

It is anticipated that pulverized DCPDH can be used for both RCRA compliance actions such that generated wastes or materials from wastewater facilities, furnaces, incinerators and other facilities do not exceed the TCLP hazardous waste criteria under TCLP or CERCLA (Superfund) response where stabilizers are added to waste piles or storage vessels previously generated. The preferred method of application of pulverized DCPDH would be in-line within the property and facility generating the heavy metal bearing material, and thus allowed under RCRA as a totally enclosed, in-tank or exempt method of TCLP stabilization without the need for a RCRA Part B hazardous waste treatment and storage facility permit.

DETAILED DESCRIPTION

Environmental regulations throughout the world such as those promulgated by the USEPA under CAA, RCRA and CERCLA require heavy metal bearing waste and material producers to manage such materials and wastes in a manner safe to the environment and protective of human health, and reduce nuisance and toxic odor emissions. In response to these regulations, environmental engineers and scientists have developed numerous means to control heavy metals and emissions, mostly through chemical applications which convert the solubility of the material and waste character to a low soluble form, thus passing leach tests and allowing the wastes to be either reused on-site or disposed at local landfills without further and more expensive control means such as hazardous waste disposal landfills or facilities designed to provide metals stabilization, and odor and emissions reduction by air dilution, odor masking agents addition or gas destruction. The primary focus of scientists has been on singular heavy metals such as lead, cadmium, chromium, arsenic and mercury, as these were and continue to be the most significant mass of metals contamination in soils. Materials such as lead paints, incinerator ash, foundry and mill flyash, auto shredder and wire shredding residues and cleanup site wastes such as battery acids and slag wastes from smelters are major lead sources. Recently, however, there exists a demand for control methods of process odor emissions and leaching of various heavy metals such as As, Hg, Cd, Cr, Pb, Cu and combinations thereof in mining waste, wastewater sludge, shredder wastes, wire insulation, incinerator flyash, incinerator bottom ash, incinerator combined ash, foundry dusts, steel mill dusts, and contaminated soils to meet nuisance regulations on odors and TCLP and also SPLP, MEP, DI and other measures intended to measure field condition leaching and/or solubility of the metals under digestion, in a manner which is rapid, low risk to workers, low impact on mechanical process equipment, low cost, avoids interim storage and curing time, and permits on-site or off-site reuse and handling at moisture levels below or at optimum for compaction and handling.

The present invention discloses a heavy metal bearing material or waste stabilization method and odor reduction method through contact of material or waste with pulverized DCPDH acid semi-soluble stabilizing agent. The DCPDH found effective is available in dry pulverized form, as well as less effective larger particle size particles, and thus can be contacted with heavy metal bearing material prior to waste generation such as in-stream at wastewater sludge producing plants or in-duct prior to air pollution control and ash collection devices or after waste production in collection devices such as hoppers, dump valves, conveyors, dumpsters or waste piles. The DCPDH is applied dry, thus allowing stabilized material and waste to remain suitable for fill material or loose handling and to remain less permeable thus allowing for transmission of leachate or water flow. The transmission of water flow becomes important an necessary when using the stabilized waste or material as base fill, cover, embankment or engineered fill, thus eliminating damming or leachate production perched water table effects.

The acid semi-soluble pulverized DCPDH dry seed stabilization method reduces the odor from waste and leachability of heavy metal bearing wastes including the groups As, Hg, Cd, Cr, Pb, and Cu and combinations thereof under TCLP, SPLP, MEP, CALWET, DI, rainwater and surface water leaching conditions as well as under regulatory water extraction test conditions as defined by waste control regulations in UK, Thailand, Japan, Switzerland, Germany, Sweden, the Netherlands and under American Nuclear Standards for sequential leaching of wastes, with use of acid semi-soluble dry chemical pulverized DCPDH "seed" to minimize weight increase of the treated waste and permit immediate stabilized matrix management and handling without curing requirements or double handling required for interim storage, and producing a free-flowing and more permeable stabilized material or waste suitable for excavator or loader loading, truck unloading and land disposal or immediate reuse spreading and compaction.

The present invention provides a method of reducing the waste odors and leachability of material or waste including the groups As, Hg, Cd, Cr, Pb, and Cu and combinations thereof under TCLP, SPLP, MEP, CALWET, acid rainwater and acid rain derived surface water leaching conditions, with use of dilute acid semi-soluble DCPDH pulverized seed that minimizes weight increase of the treated material or waste and permit immediate stabilized matrix management and handling without water application and mixing, without curing requirements and associated double handling required from interim storage piles, and while producing a free-flowing and more permeable stabilized material or waste suitable for excavator or loader loading, truck unloading and land disposal or immediate reuse spreading and compaction. The present invention recognizes the use of dilute acids as leaching fluids to which pulverized DCPDH will be added, and thus teaches use of a stabilizer that is dilute acid semi-soluble.

Unlike the present invention, prior art has taught stabilization of heavy metals by addition of water soluble or water based physical encapsulation agents, and have failed to recognize the value of pulverized DCPDH which is not water soluble, yet is soluble and surface available in dilute acetic acid (TCLP), dilute sulfuric and nitric acid (SPLP/MEP) and dilute citric acid (CALWET). In particular, O'Hara (U.S. Pat. No. 4,737,356) and Forrester (U.S. Pat. Nos. 5,245,114 and 5,430,233) teach the need to add water soluble phosphates to incinerator ash, auto shredder and wire insulation wastes, and incinerator bottom ash, which are at least 5 gm/100 ml water solubility, with the preferred embodiment being 100% water soluble phosphoric acid which increases odors. Prior art stabilization methods using Portland cement, lime, cement kiln dust, phosphoric acids, and combinations also produce a reduced permeability matrix or solid material form by adding water (by combination or as part of the water soluble agent addition) to the stabilization recipe for a chemical reaction which presents post-stabilization handling and disposal complications, whereas the present invention use of pulverized DCPDH acts to reduce odors and metals solubility without significant reduction or increase of permeability, without formation of cement-like non-free flowing material or waste, without curing time, without water hydration and associated material and waste weight increase, without double material and soil handling required for curing stockpiles, thus permitting immediate stabilized material or waste handling, loading, disposal or reuse and management in close proximity to residential and commercial operations. The pulverized DCPDH acid semi-soluble seed stabilization method operates on the basic principle that sufficient wet dilute acid environment contact and mixing between the material or waste and the pulverized DCPDH will occur within the TCLP, SPLP, MEP or CALWET extraction vessel. The extraction method(s) used to predict leaching potential all assume that field material or waste disposal conditions are subject to hydration by acid rainwater or acid leachate and involve some degree of interstitial mixing of heavy metals with the extract fluid over some minimal period of time in a saturated environment, and that such hydration can be simulated by an extract solute addition and mixing period. The pulverized DCPDH stabilization method thus utilizes the regulatory extraction procedure to allow for post-stabilized material or waste hydration, mixing and wet chemistry dilute acid environment contact between heavy metals and pulverized DCPDH seed. The extraction tests thus act as dilute acid stirred tank reactors, which provide the opportunity for heavy metals on the surface of materials and waste, and that which diffuses into the acid solution, to have ample opportunity to contact pulverized DCPDH seed that also has surface active and/or semi-soluble mineral formation potentials with the dilute acid soluble and/or available heavy metals. One unique benefit of the pulverized DCPDH technology is that SPLP, MEP, TCLP and CALWET extract fluid acid semi-soluble pulverized DCPDH can be applied to waste or material and dry mixed for uniformity in the field, and consequently test samples of such stabilizers are allowed to freely tumble or mix in the presence of the heavy metals in the extract solution for a given extraction period of time. This non-cemented and non-reacted acid semi-soluble pulverized DCPDH surface mixing greatly improves the wet environment substitution of heavy metals such as Pb, Cd, Cr, and Cu into DCPDH surfaces. The extraction device effectively puts the heavy metals into solution of suspension as well as acid semi-soluble pulverized DCPDH into suspension and solution and thus provides an excellent opportunity for surface substitution, sorption and precipitation of now solution soluble heavy metals. Under this chemical mechanism, some pulverized DCPDH is made available to the solution by the acid solution, and heavy metal ions are made available to the solution which in turn substitute and exchange for calcium on insoluble DCPDH surfaces and precipitate with certain semi-soluble DCPDH in the extract acid solution.

It is anticipated that pulverized DCPDH, and fine particle DCPDH to a less effective degree, can be used for both RCRA compliance actions such that generated materials from mining operations, wastewater facilities, furnaces, incinerators and other facilities do not exceed appropriate TCLP hazardous waste criteria under TCLP, or used for CERCLA (Superfund) response where stabilizers are added to waste piles or storage vessels previously generated and now regulated under RCRA as a hazardous waste pre-disposal. The preferred method of application of DCPDH would be in a pulverized form and in-line within the property and facility generating the heavy metal bearing material, and thus allowed under RCRA as a totally enclosed, in-tank or exempt method of TCLP stabilization without the need for a RCRA Part B hazardous waste treatment and storage facility permit(s).

DCPDH may also be used in combination with Portland cement, cement kiln dust, lime kiln dust, silicates, lime, dolomitic lime, magnesium oxide, quicklime, phosphates, lime, ferric sulfate, ferrous sulfate, ferric chloride, iron powder, iron filings, chlorides, carbonates, monoammonia phosphate (MAP), diammonium phosphate (DAP), single superphosphate (SSP), triple superphosphate (TSP), hexametaphosphate (HMP), tetrapotassium polyphosphate, dicalcium phosphate, tricalcium phosphate, monocalcium phosphate, phosphate rock, pulverized forms of all above dry phosphates, and combinations thereof depending on additional waste management needs such as strength, permeability, odor control and additional heavy metals control. In certain cases one may provide several additives such as iron, aluminum and other complexing agents which could also provide for a single-step formation of complexed apatites or low solubility minerals such as chloropyromorphite, plumbogummite or corkite. The stabilizer combination type, size, dose rate, contact duration, and application means could be engineered for each type of heavy metal bearing material or waste.

Although the exact stabilization formation molecule(s) are unknown at this time, it is expected that when heavy metals comes into contact with the pulverized DCPDH stabilizing agent in the presence of extraction fluids used during the extraction analyses, compound(s) begin to form such as a hydroxyapatites and phosphate metal precipitates through molecular substitution, aqueous precipitation, or surface sorption, which is less soluble than the heavy metal element or molecule originally in the material or waste. Specifically complexing and/or twinning of As, Hg, Pb, Cr, Cu, and Cd into pyromorphite and calcium apatites most likely occurs by adding DCPDH to the material or waste and within the extractor fluids at standard temperature and pressure. The exact odor control method is not know at this time, but is expected to result from the adsorptive nature and neutral pH range of the DCPDH. It also remains possible that modifications to temperature and pressure may accelerate of assist formation of minerals, although such methods are not considered optimal for this application given the need to limit cost and provide for optional field based stabilizing operations that would be complicated by the need for pressure and temperature control devices and vessels.

Examples of suitable stabilizing agents include, but are not limited to, DiCalcium Phosphate DiHydrate (DCPDH) in pulverized form and various fine particle form. The amounts of DCPDH agent used and the particle size selected, according to the method of invention, depend on various factors including desired solubility reduction potential, odor control desired, desired mineral toxicity, and desired mineral formation relating to toxicological and site environmental control objectives. It has been found that an amount of 0.5% pulverized DCPDH by weight of incinerator bottom ash waste, and 2.0% pulverized DCPDH by weight of combined incinerator ash, is sufficient for initial TCLP Pb and TCLP Pb and Cd stabilization to less than RCRA limits of 5.0 and 1.0 respectively and reduction of odor. However, the foregoing is not intended to preclude yet higher or lower usage of DCPDH or combinations with other agents if needed, since it has been demonstrated that amounts greater than 2% DCPDH by weight of waste also work, but are more costly. The examples below are merely illustrative of this invention and are not intended to limit it thereby in any way.

EXAMPLE 1

In this example refuse incinerator bottom ash was stabilized with varying amounts of phosphoric acid (75% H3PO4) and DCPDH with zero (0) days of sample curing pre-TCLP extraction. Both stabilized and un-stabilized ash was subsequently tested for TCLP Pb, Cd, Cr, and Cu and ash product sensible odor. Samples were extracted according to TCLP procedure set forth in Federal Register, Vol. 55,No. 126, pp. 26985-26998 (Jun. 29, 199), which is hereby incorporated by reference. The leachate was digested prior to analysis by ICP. Phosphate mixtures produced free flowing ash suitable for land disposal, passed the paint filter test, with less than 20 PSI unconfined strength. Sample odor was tested by mixing ash with different levels of activated carbon and thereafter sensing odor by a panel of nine persons. The odor index of each sample was calculated by multiplying the average odor sense index by 33 and producing a maximum odor index of 0 to 99. The lower the number index, the stronger the odor encountered by the panel.

TABLE 1

| Stabilizer Dose (%) | TCLP Cd/Pb/Cr/As (ppm) | Odor Level |
|---|---|---|
| 0 | 0.148/8.03/0.23/0.005 | 35.3 (Baseline) |
| 0.4% H3PO4 | 0.140/0.80/0.48/0.036 | 31.5 (Highest Odor) |
| 0.4% DCPDH pulverized | 0.09/0.73/<0.01/<0.01 | 69.2 (Least Odor) |

The foregoing results in Table 1 readily established the operability of the present process to dry stabilize metals thus reducing leachability and odor while also producing wastes suitable for handling and disposal without curing time. Given the effectiveness of pulverized and fine particle DCPDH in causing heavy metals to stabilize and reduce odor as presented in the Table 1, it is believed that an amount of pulverized DCPDH equivalent to less than 1% by weight of heavy metal bearing material or waste should be effective.

While this invention has been particularly shown and described with reference to preferred embodiments thereof, it will be understood by those skilled in the art that various changes in form and details may be made therein without departing from the spirit and scope of the invention as defined by the appended claims.

I claim:

1. A method of reducing the leachability and odor of heavy metal bearing material or waste in incinerator bottom ash, comprising contacting the heavy metal bearing material or waste in the incinerator bottom ash with pulverized or fine particle DiCalcium Phosphate DiHydrate (DCPDH) in an amount effective in reducing the leaching of heavy metals from the material or waste in the incinerator bottom ash to a level no more than non-hazardous levels as determined in an EPA TCLP test, performed on the stabilized material or waste in the incinerator bottom ash, as set forth in the Federal Register, vol. 55, no. 126, pp. 26985-26998 (Jun. 20, 1990), and odor in accordance with odor index by olfactory measure.

2. The method of claim 1 wherein the incinerator bottom ash contains at least one of As, Ag, Ba, Cd, Cr, Pb, Se, Hg, Sb, Cu, Ni and Zn bearing material or waste and is contacted with the pulverized or fine particle DCPDH prior to collection of the material or waste in containers.

3. The method of claim 1 wherein the incinerator bottom ash contains at least one of As, Ag, Ba, Cd, Cr, Pb, Se, Hg, Sb, Cu, Ni and Zn bearing material or waste and is contacted with the pulverized or fine particle DCPDH during or after collection of the material or waste in containers or during or after generation of the material or waste as a regulated waste.

4. The method of claim 1, wherein the pulverized or fine particle DCPDH is combined with cement kiln dust, Portland cement, silicates, lime, dolomitic lime, magnesium oxide, quicklime, phosphates, lime, ferric chlorides, ferric sulfates, ferric ions, iron powder, iron filings, chlorides, carbonates, monoammonia phosphate (MAP), diammonium phosphate (DAP), single superphosphate (SSP), triple superphosphate (TSP), hexametaphosphate (HMP), tetrapotassium polyphosphate, dicalcium phosphate, tricalcium phosphate, monocalcium phosphate, phosphate rock, pulverized forms of all above dry phosphates, mineral complexing agents, or combinations thereof.

5. A method of reducing the leachability and odor of combined heavy metal bearing material or waste in incinerator bottom ash, comprising contacting the heavy metal bearing material or waste in the incinerator bottom ash with pulverized or fine particle DiCalcium Phosphate DiHydrate (DCPDH) in an amount effective in reducing the leaching of combined heavy metals from the material or waste to a level no more than non-hazardous or non-acceptable levels as determined in the Synthetic Precipitant Leaching Procedure (SPLP) test, Multiple Extraction Procedure (MEP) test, United Kingdom carbonated DI water leach test, Japan carbonated DI water leach test or Swiss sequential water leach test, performed on the stabilized material or waste in the incinerator bottom ash, and reducing odor to desired levels.

6. The method of claim 5 wherein the incinerator bottom ash contains at least one of As, Ag, Ba, Cd, Cr, Pb, Se, Hg, Sb, Cu, Ni, and Zn and is contacted with the pulverized or fine particle DCPDH prior to collection of the waste or materials in containers.

7. The method of claim 5 wherein the incinerator bottom ash contains at least one of As, Ag, Ba, Cd, Cr, Pb, Se, Hg, Sb, Cu, Ni, and Zn and is contacted with pulverized or fine particle DCPDH during or after collection of the waste or material in containers or during or after generation of the waste or material as a regulated waste.

8. The method of claim 1, wherein the amount of the pulverized or fine particle DCPDH contacted with the incinerator bottom ash is at least about 0.5% by weight of the incinerator bottom ash.

* * * * *